Sept. 7, 1965

B. BARON ETAL 3,204,837

PLEATING MACHINE

Filed May 25, 1964

INVENTORS
BERT BARON
DUDD BARON
BY
Kane, Dalsimer & Kane
ATTORNEYS

B. BARON ETAL 3,204,837

PLEATING MACHINE

Filed May 25, 1964

INVENTORS
BERT BARON
DUDD BARON
BY
Kane Dalsimer & Kane
ATTORNEYS

United States Patent Office 3,204,837
Patented Sept. 7, 1965

3,204,837
PLEATING MACHINE
Bert Baron, Floral Park, and Dudd Baron, Commack, N.Y., assignors to Apex Automatic Devices Corp., Hicksville, N.Y., a corporation of New York
Filed May 25, 1964, Ser. No. 369,737
9 Claims. (Cl. 223—34)

This invention relates generally to pleating machines and more particularly to a machine for automatically forming a plurality of pleats in a piece of material. The invention as shown and described contemplates the formation of five pleats in a piece of material, but the concept of the invention is sufficiently broad to provide a machine for forming any number of pleats by slight modification of the design.

The object of the invention is to provide a machine for automatically forming a plurality of pleats.

A pleating machine embodying the invention and the manner of using the same is described herein with references to the drawings in which.

The machine is designed so that an operator will grasp the material to be pleated and insert it in the machine beneath mechanical pleating fingers of which there are five arranged in a row spaced from one another so that five separate pleats can be placed in the goods without movement of the goods by the operator. The pleating fingers are separated by downwardly movable fingers referred to as pre-setters of which there are four—one between each two adjacent pleating fingers. Each of the pleating fingers has a stapler associated therewith. A constantly oscillating main shaft disposed horizontally is coupled through gearing to each of the pleating fingers.

The sequence is such that upon placing material in the machine the setter pleating finger forms the first pleat which is stapled. The two adjacent pre-setters are brought down and pull the material downwardly on either side of the first pleating finger. The pre-setters then are returned to the original position above the material and the next adjacent pleaters operate forming pleats which are stapled in position on either side of the first pleat. The remaining pre-setter fingers and pleater fingers are operated in the same manner to result in five pleats. The material is then withdrawn from the machine and the pleats are stitched through utilization of a sewing machine. The staple is then removed, although it need not be.

Figure 1:
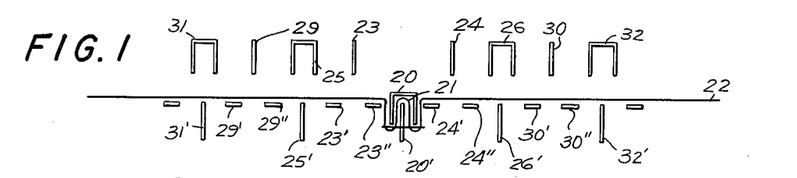
FIGS. 1 through 6 are schematic illustrations of the sequence of operation of the machine.
Figure 2:
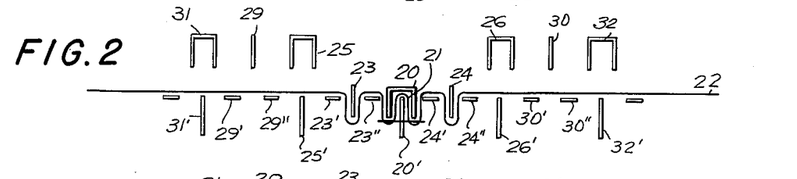
Figure 3:
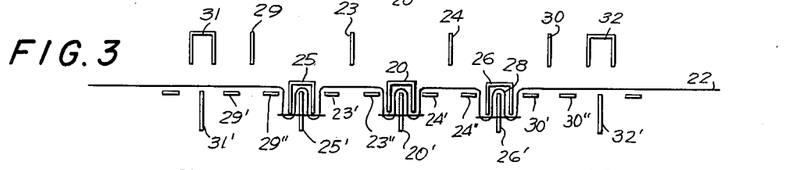
Figure 4:
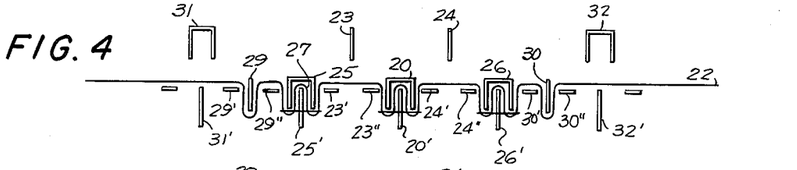
Figures 5, 6:
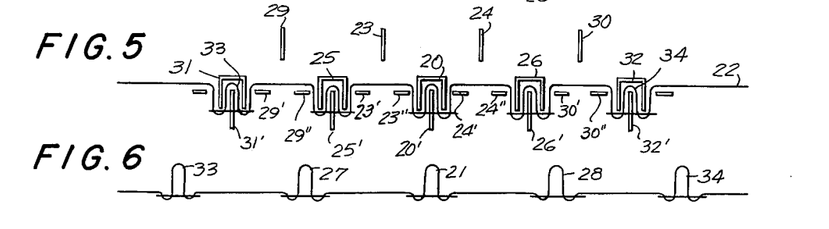
Figure 7:
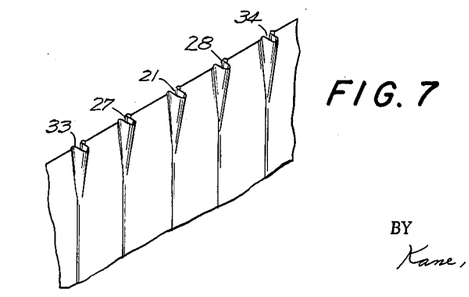
FIG. 7 is a perspective view of the finished product.

The sequence of operation is shown in FIGS. 1 through 6 wherein the first pleating finger is indicated by the numeral 20 in position having formed a pleat 21 in cooperation with lower pleating finger 20′ in material 22. The pleat is stapled. The pre-set fingers 23 and 24 are then brought down as shown in FIG. 2 cooperating with pre-set bottom fingers 23′ and 23″ and 24′ and 24″ to adjust the material and are returned so that pleating fingers 25 and 26 can be brought down to form respectively pleats 27 and 28 which are stapled, in cooperation with pleating fingers 25′ and 26′. Pre-set fingers 29 and 30 are then lowered and returned to position and pleating fingers 31 and 32 are lowered to form pleats 33 and 34 which are then stapled.

Figure 8:
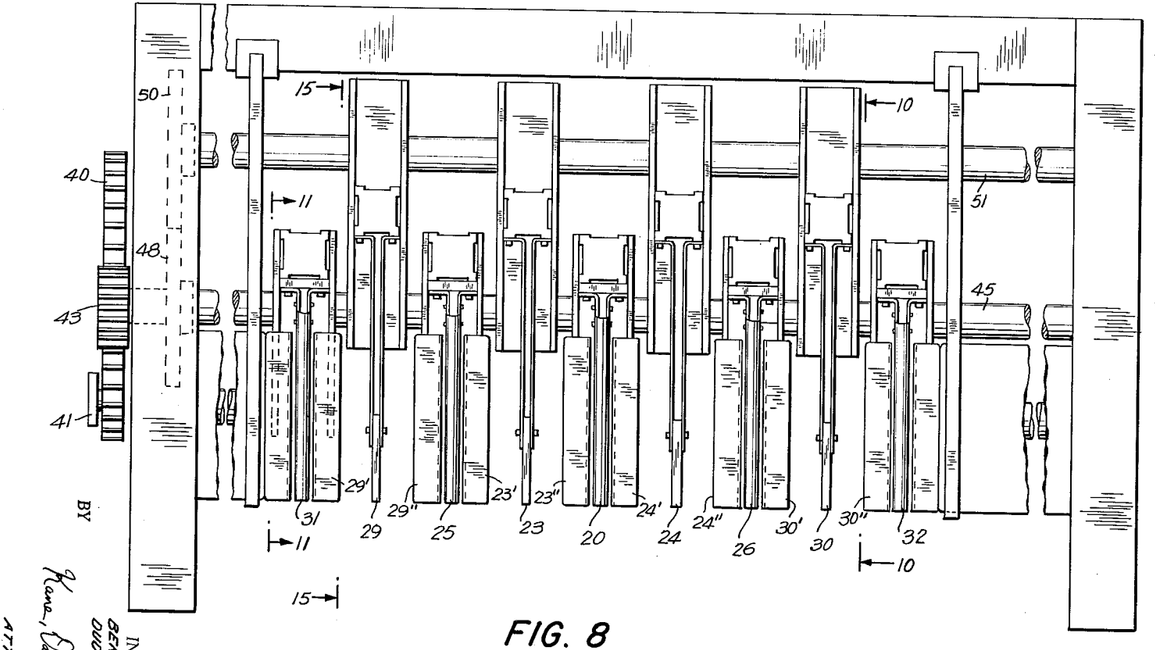
FIG. 8 is top plan view of the machine.
Figure 9:
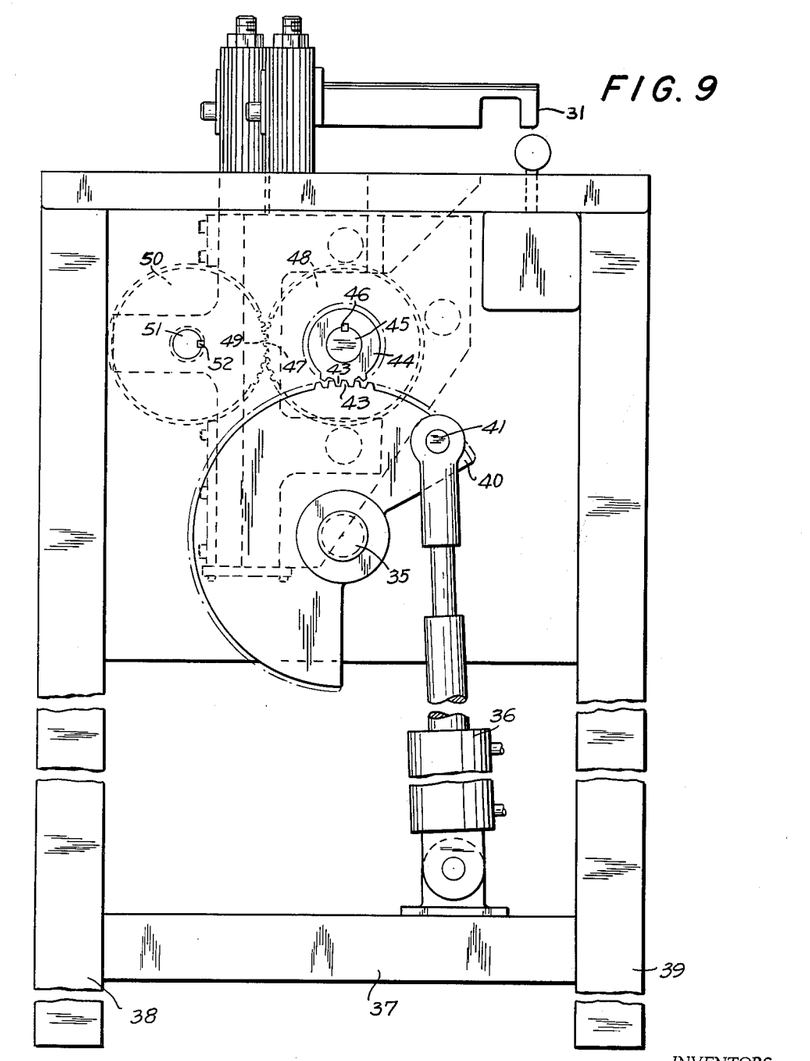
FIG. 9 is an end elevation of the machine.

Referring now to FIGS. 8 and 9, the main shaft is indicated by the numeral 35 and made to constantly oscillate through pneumatic action developed by air cylinder 36 which is mounted on cross member 37 supported between vertical members 38 and 39 and which is attached at its upper end to main gear 40 by a pivotal connection at 41. Main gear 40 is a segmented gear which has a tooth section 42 in engagement with the teeth 43 of gear 44 keyed to the pleater camshaft 45 by key 46. The teeth 47 of gear 48 on the pleater camshaft 45 engage the teeth 49 of gear 50 which is keyed to pre-set camshaft 51 by key 52.

With this arrangement oscillation of main shaft 35 is transmitted to the pleater camshaft 45 and the pre-set camshaft 51.

Each of the pleater fingers has a cam associated therewith mounted upon camshaft 45 and each of the pre-set fingers has a cam associated therewith mounted on camshaft 51. The pleater camshaft is also the stapler camshaft, as will be explained below.

Figures 10, 17:
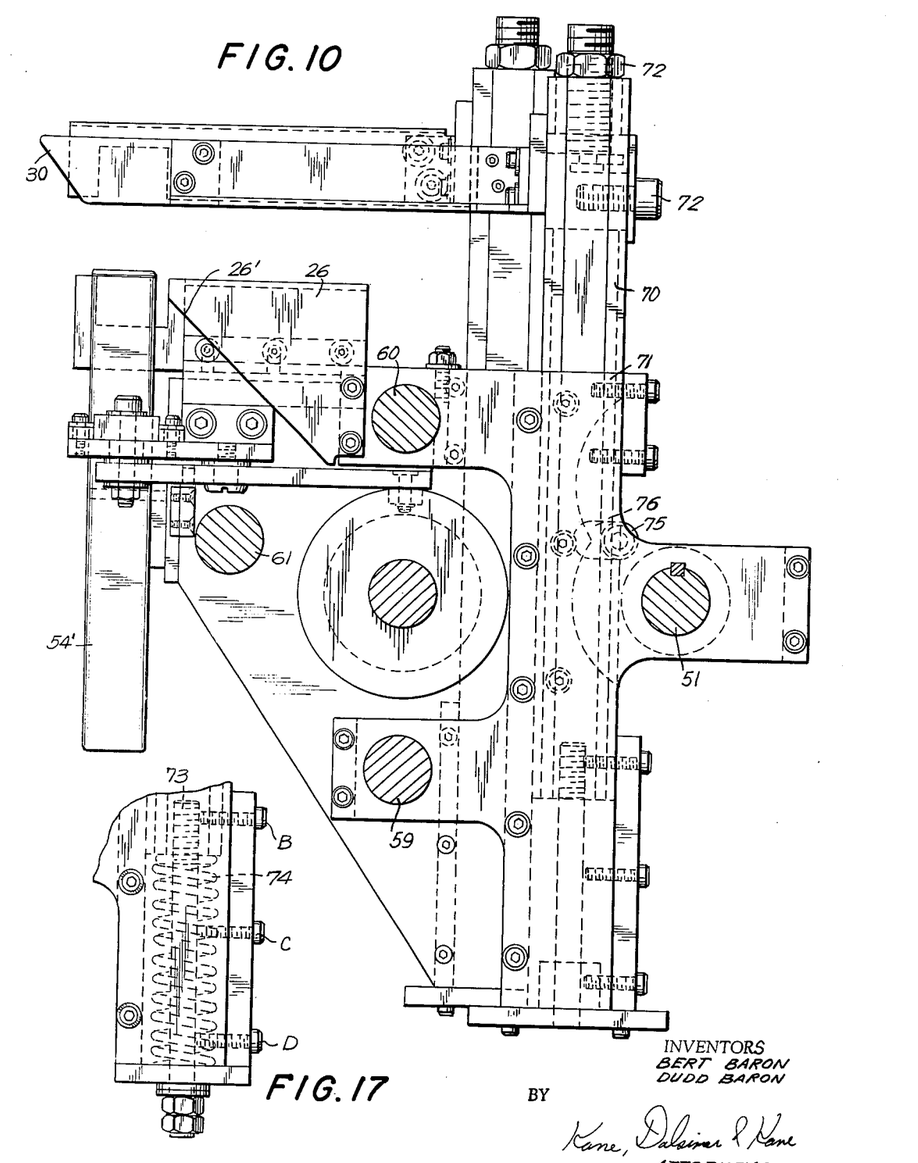
FIG. 10 is a vertical cross-sectional view taken along the line 10—10 in the direction of the arrows in FIG. 8 showing the pleater and pre-setter assemblies.
FIG. 17 is a segmentary view of the spring which is utilized to return the pre-setter to raised position.
Figures 11, 13:
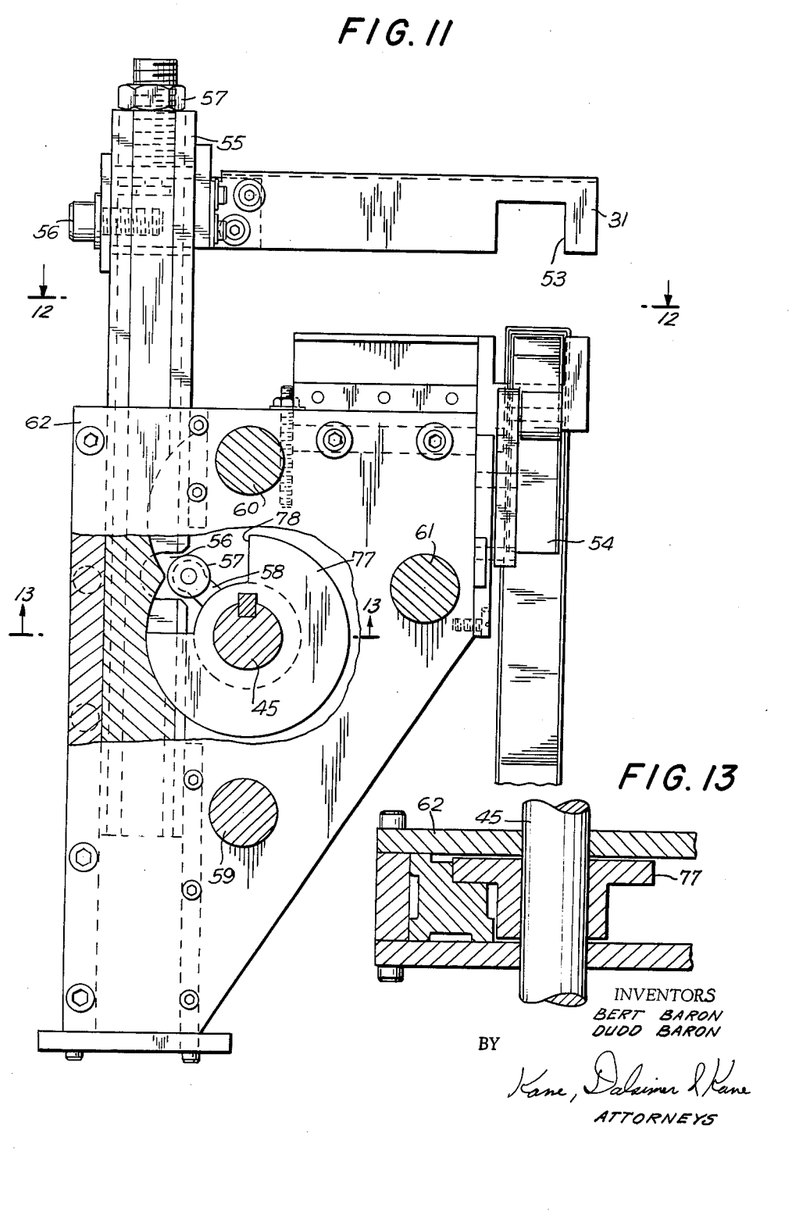
FIG. 11 is a vertical cross-sectional view taken along the line 11—11 in the direction of the arrows in FIG. 8 showing the pleater assembly partly in section and partly broken away.
FIG. 13 is a horizontal cross-sectional view taken along the line 13—13 in the direction of the arrows in FIG. 11 showing the pleater and cam assembly.

Referring now to FIGS. 10 and 11 which are cross-sectional views taken on FIG. 8 and which disclose the detail construction of the pleater finger 31 and the mechanism associated therewith and former or pre-set finger 30 and the mechanism associated therewith. The pleater former finger is in cross section a U with an open section 53 allowing clearance for the stapler 54 associated therewith. Finger 31 is fastened to vertically movable shaft 55 upon which adjustment screws 56 and 57 are provided. Shaft 55 is provided with recess 56 facing pleater camshaft 45 and receiving therein roller 57 supported at an end of arm 58 which is keyed to the camshaft and which provides a cam transmitting motion of the shaft 45 to vertically movable shaft 55. It is apparent, therefore, that oscillation of shaft 45 will be transmitted to vertical shaft 55 oscillating the same vertically.

In FIG. 11 members 59, 60 and 61 are bracing shafts which remain stationary. Bracket 62 forms part of the housing of the machine and supports lower pleater former finger 31′ and stapler 54. Such an assembly is associated with each of the pleater former fingers.

Figure 12:
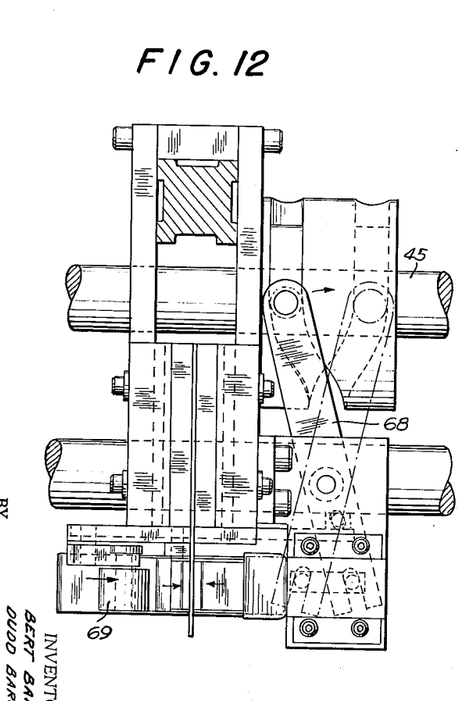
FIG. 12 is a horizontal cross section taken along the line 12—12 in the direction of the arrows in FIG. 11 showing the pleater and stapler assembly.
Figure 14:
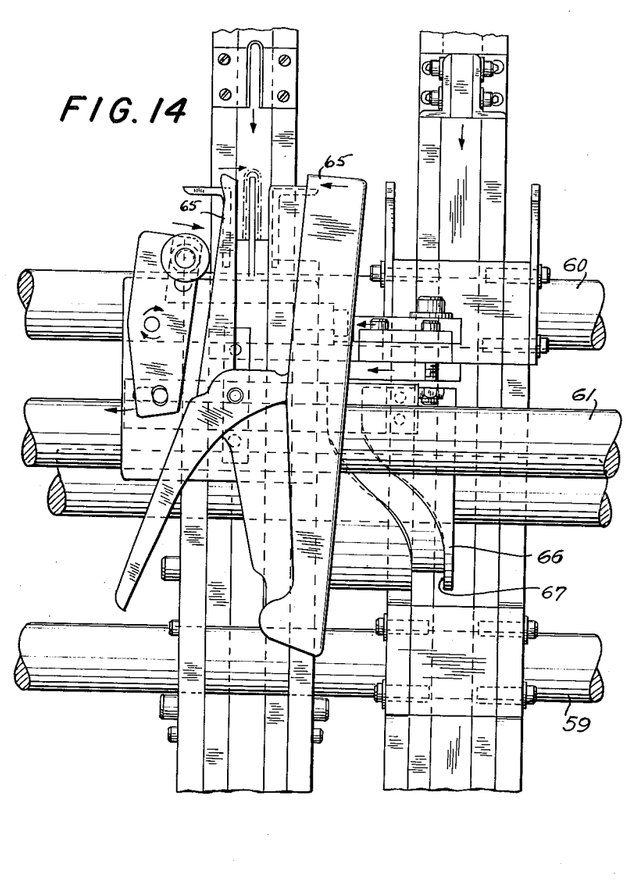
FIG. 14 is a partial front elevation taken along the line 14—14 in the direction of the arrows in FIG. 12 showing the stapler assembly.
Figures 15, 16:
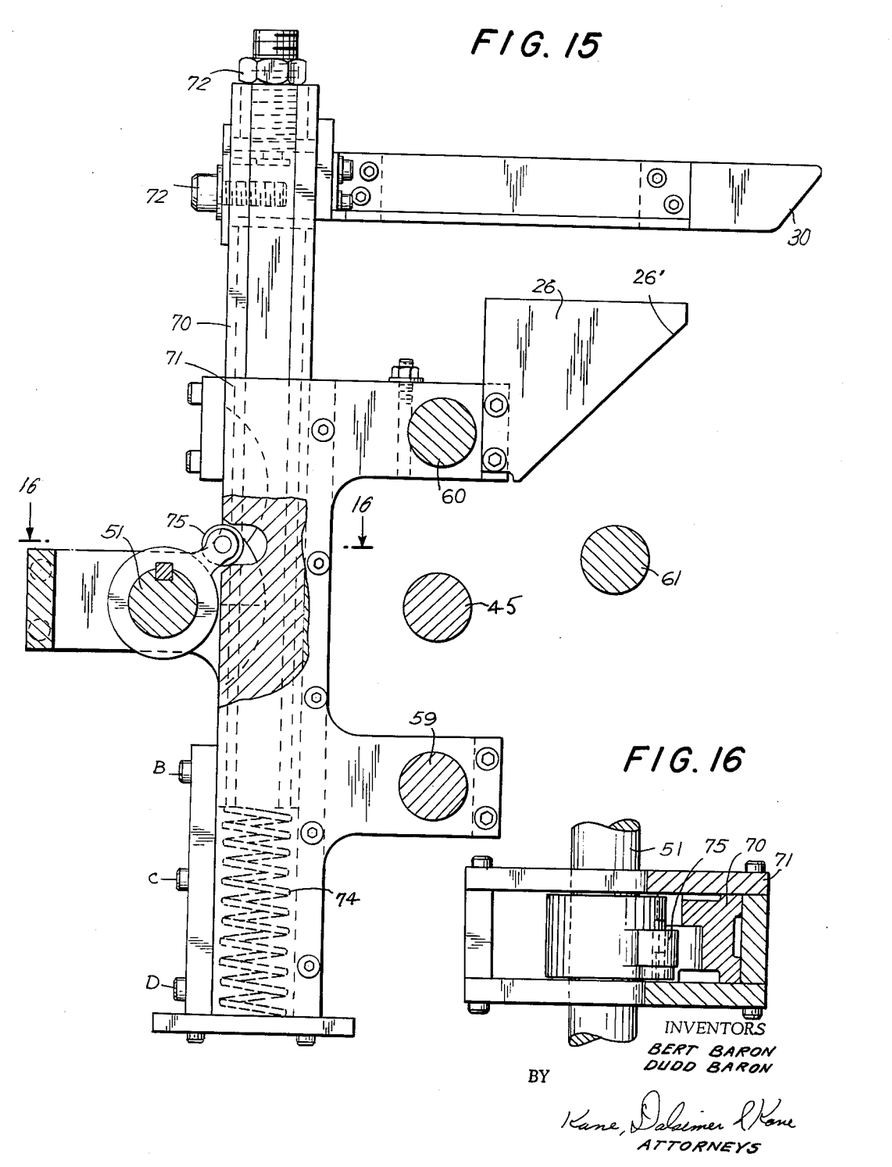
FIG. 15 is a vertical cross-sectional view taken along the line 15—15 in the direction of the arrows in FIG. 8 showing the pre-setter.
FIG. 16 is a horizontal cross-sectional view taken along the line 16—16 in the direction of the arrows in FIG. 15 showing the pre-setter cam assembly.

The stapler is shown in greater detail in FIGS. 12 and 14 and is an ordinary stapler having an anvil side 65 and a second side 65 which is movable. Stapler actuating cam 66 having a groove 67 therein is rotated by the pleater camshaft 45 allowing linkage 68 having one end within groove 67 and the other end pivotally connected to roller 69 to move the linkage from one position shown in FIG. 12 to the position shown in phantom in FIG. 12 moving the roller and allowing the roller to push the anvil side of the stapler to effect a stapling action in timed sequence with the movement of the pleater former finger 31. Hence there is an assembly as shown in FIGS. 11, 12 and 14 whereby upon rotation of shaft 45 the pleater former finger can be lowered to the position shown in FIG. 5 and the pleat formed thereby stapled into semi-permanent position.

The mechanism described above is identical to the mechanism associated with each of the remaining pleater former fingers.

In FIG. 10 the mechanism associated with pre-set finger 30 is shown. Finger 30 is mounted upon a vertically movable shaft such as shaft 55 in FIG. 11. Shaft 55 was movable vertically in bracket 62 and the vertically movable shaft supporting pre-set finger 30 is indicated by the numeral 70 vertically movable in bracket 71 and provided with adjustment screw 72. The pre-set finger is rectangular in cross section and in the form of a knife. It is seen in FIG. 10 that one side of the pleater former finger 26 is disposed angularly. This side is indicated in the figures by the numeral 26' and has such configuration to allow clearance for the stapler associated therewith indicated by the numeral 54'.

The lower end vertically movable shaft 70 is fastened to shaft 73 disposing spring 74 between the lower end of shaft 70 and plate 75 yieldingly urging shaft 70 upwardly at all times. The pre-set camshaft 51 mounts an arm and roller 75 of the type 57 shown in FIG. 11 which is received within recess 76 in shaft 70 so that rotation of pre-set camshaft 51 will be transmitted as vertical motion to shaft 70.

It is noted upon reference to FIG. 11 that a flange portion 77 is provided in association with the roller 57 to that the flange 77 will hold the pleater former finger down due to insertion of edge 78 in recess 56 preventing return movement of the pleater former finger due to further oscillation of the main shaft and the pleater camshaft 45. As was set forth above in the description of the sequence of operation, in each instance when the pleater has been brought into position to form a pleat it has remained lowered throughout the remaining sequence. The pre-set fingers, however, are immediately returned after lowering, and as noted in FIG. 10 there is no flange on the cam associated with roller 75. In the operation of the device the pre-set finger in each instance is lowered by a roller within a recess such as roller 75 and roller 76 compressing spring 74 which upon change of direction of rotation of shaft 51 during oscillation immediately forces the vertical movable shaft upwardly returning the associated pre-set finger to its initial upper position.

Thus it is seen in FIG. 10 that mechanism is provided to lower the pre-set fingers as desired in sequence with the pre-set finger immediately returning to its upward position.

With the mechanism described above, the sequence set forth in FIGS. 1 through 6 is readily obtained by arrangement of the various cams so that oscillation of the main shaft causing oscillation of the pre-set camshaft and the pleater camshaft will effectively lower and raise the pre-set fingers as desired, lower the pleaters as desired and effect the stapling action.

Figure 18:
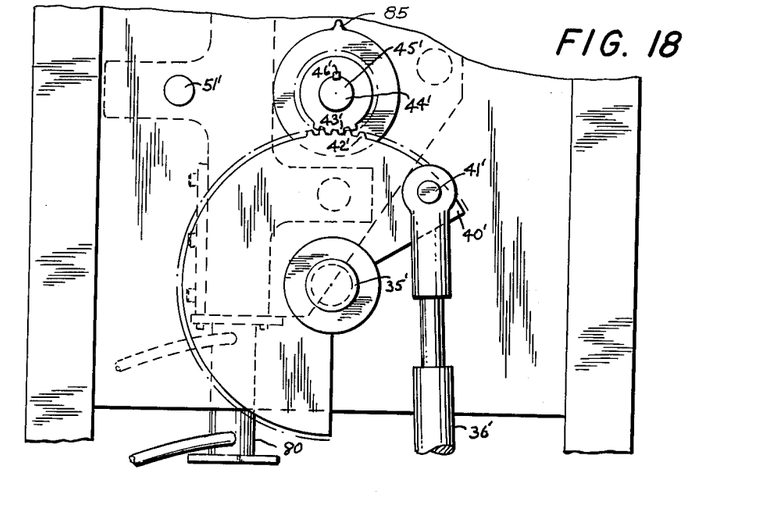
FIG. 18 is an end elevation of a machine constructed according to an alternate embodiment of the invention.
Figure 19:
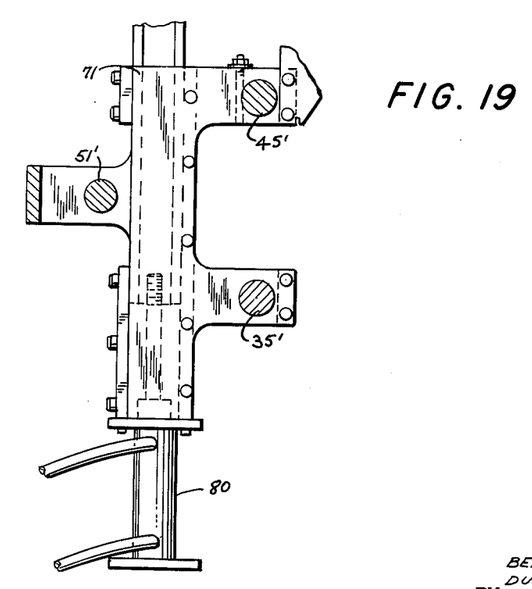
FIG. 19 is a vertical cross-sectional segmentary view showing the pre-setter of the alternate embodiment shown in FIG. 18.

In FIGS. 18 and 19 an alternate embodiment of the invention is shown in which the pleater finger assembly is the same as that described above in which cylinder 36' is pivotally attached to gear 40' at pivot point 41' oscillating main shaft 35'. Teeth 42' of gear 40 mesh with teeth 43' of gear 44' keyed to pleater camshaft 45' at key 46'. In this embodiment of the invention, however, gear 48 is not provided since the pre-set fingers are operated wholly by pneumatic action with the shaft which was the pre-set camshaft in the first embodiment acting only as a bracing member. This shaft is shown as 51' in the figures but it does not rotate.

Each of the pre-set fingers is provided with a pneumatic cylinder 80 in the position in the assembly formerly occupied by spring 74 of FIG. 18.

In the alternate embodiment, however, in view of the utilization of the pneumatic cylinder a series of timing dogs must be provided on the pleater camshaft in order to regulate the cycle of operation of the pneumatic cylinder and the pre-set fingers. Dog 85 is shown in the figures as an example representative of four angularly arranged dogs which electrically energize the pneumatic valve by abutment with a microswitch. The first dog effects lowering pre-set fingers 23 and 24 and the second dog effects raising of these pre-set fingers. The third dog effects lowering of pre-set fingers 29 and 30 while the fourth dog causes these pre-set fingers to return.

It is obvious, therefore, that with either embodiment a plurality of pleats can be formed and the number of pleats so formed is wholly dependent upon the manner in which the machine is built rather than upon the theory of the invention.

Thus, among others, the several objects in the invention as specifically aforenoted, are achieved. Obviously, numerous changes in construction and rearrangement of parts might be resorted to without departing from the spirit of the invention as defined by the claims.

We claim:

1. An automatic pleating machine for placing pleats in fabric including in combination a plurality of vertically movable pleating fingers for forming pleats in said fabric, a plurality of vertically movable preset fingers with each preset finger of said plurality disposed between adjacent pleating fingers, first means for raising and lowering individual pleating fingers of said plurality in timed sequence, second means for raising and lowering predetermined pairs of preset fingers of said plurality in timed sequence, stapler means respectively associated with each pleating finger for stapling the pleat formed in said fabric by said pleating finger, and each of said stapler means being actuated by said first means.

2. An automatic pleating machine in accordance with claim 1 in which a first pleating finger of said plurality is provided centrally of said plurality and constructed and arranged to be lowered by said first means to form a pleat, first and second preset fingers are provided one on each side of said first pleating finger and are adopted to be lowered and raised to position said fabric after said first pleating finger has been lowered.

3. An automatic pleating machine in accordance with claim 2 in which second and third pleating fingers are provided and each is spaced from said first and second preset fingers on the side thereof away from said first pleating finger, said second and third pleating fingers being constructed and arranged to be lowered by said first means to form pleats upon the raising of said first and second preset fingers, third and fourth preset fingers are provided respectively spaced from one of said second and third pleating fingers on the side thereof away from said first pleating finger and are adopted to be lowered and raised after said second and third pleating fingers have been lowered, fourth and fifth pleating fingers each of which is respectively spaced from one of said third and fourth preset fingers on the side thereof away from said first pleating finger, and said fourth and fifth pleating fingers being constructed and arranged to be lowered by said first means to form pleats upon the raising of said third and fourth preset fingers.

4. An automatic pleating machine for placing pleats in fabric in accordance with claim 2 in which a constantly oscillating main shaft is provided and said first means consists of a shaft geared to said main shaft and constantly oscillated thereby, pleating cams on said shaft and disposed in spaced and radial relationship providing a cam for each of said pleating fingers and said second means is a second shaft geared to said first shaft, preset cams on said second shaft in spaced and angular relationship providing one preset cam for each preset finger to lower said preset fingers in timed sequence and a spring return is provided for each of said preset fingers returning said fingers to raised position upon release by said respective preset cam.

5. An automatic pleating machine for placing pleats in fabric in accordance with claim 4 in which said stapler means is actuated by a cam coupled to said first shaft.

6. An automatic pleating machine for placing pleats in fabric in accordance with claim 1 in which each of said pleating fingers is in the form of an inverted U which cooperates with a bottom nonmovable pleating finger having an edge receivable within said U enclosing fabric therebetween, and each of said preset fingers is in the form of a rectangular member with a straight lower edge which cooperates with stationary lower preset fingers to position said fabric for the formation of pleats.

7. An automatic pleating machine for placing pleats in fabric including in combination a main shaft, means for constantly oscillating said main shaft angularly, a pleater cam shaft coupled to said main shaft and oscillated thereby angularly, a preset cam shaft coupled to said main shaft and oscillated thereby angularly, a pleating finger for forming pleats in said fabric vertically movable and coupled to said pleater cam shaft, a preset finger vertically movable coupled to said preset cam shaft, said pleating finger and said preset finger constructed and arranged to be raised and lowered by said respective shafts in timed relation, and means coupled to said pleater cam shaft for semi-permanently maintaining a pleat formed by said pleater finger in said fabric.

8. An automatic pleating machine in accordance with claim 7 in which a cam is fixed to said pleater cam shaft and said pleating finger is formed with a recess to receive said cam whereby said cam can move said pleating finger downwardly and maintain it in position, and a preset cam is provided on said preset cam shaft, a recess is formed in said preset finger receiving said cam whereby said cam can lower said preset finger, and means are provided for independently returning said preset finger to raised position.

9. An automatic pleating machine for placing pleats in fabric including in combination a main shaft, means for constantly oscillating said main shaft angularly, a pleater cam shaft coupled to said main shaft and oscillated thereby angularly, a pleating finger for forming pleats in said fabric vertically movable and coupled to said pleater cam shaft, a preset finger vertically movable, said pleating finger constructed and arranged to be raised and lowered by said pleater cam shaft in timed relation, a pneumatic cylinder coupled to said preset finger constructed and arranged to raise and lower said preset finger in timed relation with the rotation of said pleater cam shaft, and means coupled to said pleater cam shaft for semi-permanently maintaining a pleat formed by said pleater finger in said fabric.

References Cited by the Examiner

UNITED STATES PATENTS

| | | | |
|---|---|---|---|
| 1,903,618 | 4/33 | Brintnall | 223—34 |
| 2,830,401 | 4/58 | Davies et al. | 223—34 |
| 2,837,257 | 6/58 | Gibson et al. | 223—30 |

JORDAN FRANKLIN, *Primary Examiner.*